Aug. 24, 1954

W. F. BENNETT 2,687,183

ENGINE AIR CONDITIONER

Filed July 29, 1952

William F. Bennett
INVENTOR.

Aug. 24, 1954 W. F. BENNETT 2,687,183
ENGINE AIR CONDITIONER
Filed July 29, 1952 2 Sheets-Sheet 2

William F. Bennett
INVENTOR.

Patented Aug. 24, 1954

2,687,183

UNITED STATES PATENT OFFICE 2,687,183

ENGINE AIR CONDITIONER

William F. Bennett, Everett, Pa.

Application July 29, 1952, Serial No. 301,520

2 Claims. (Cl. 183—10)

This invention relates in general to attachments for internal combustion engines, and more specifically to an air conditioner for intake air for internal combustion engines.

The primary object of this invention is to provide clean cool air to an internal combustion engine, especially when operating under hot, dry and dusty conditions.

Another object of this invention is to provide an improved air cleaner for internal combustion engines which efficiently cleans intake air and at the same time offers a minimum restriction to the incoming air.

Another object of this invention is to provide an improved attachment for carburetors of internal combustion engines for cleaning and cooling intake air whereby the operating temperature of an internal combustion engine so provided will be lowered and the engine life lengthened.

Another object of this invention is to provide an improved air conditioner for cooling and cleaning intake air, said air conditioner being so constructed and designed whereby the same may be conveniently attached to existing carburetors or other intake ports of internal combustion engines.

A further object of this invention is to provide an improved air conditioner for cooling and cleaning intake air of an internal combustion engine, said air conditioner cooling intake air and at the same time offering a minimum of resistance to the passage of the same therethrough whereby the volumetric efficiency of the engine is increased thereby increasing the horsepower output of the engine and resulting in added performance and economy.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Similar characters of reference designate similar or identical elements and portions throughout the specification and throughout the different views of the drawings.

Figure 1:
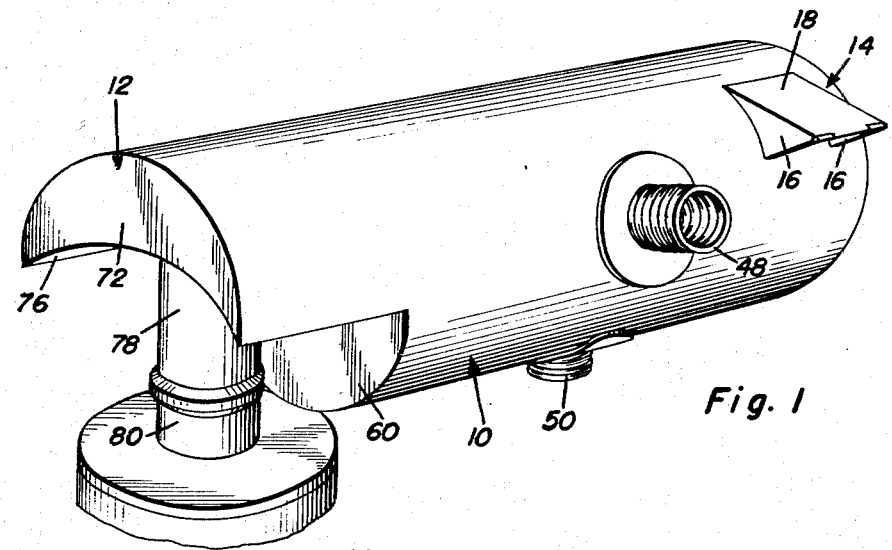
Figure 1 is a perspective view of the improved engine air conditioner, which is the subject of this invention, and shows the same attached to the top of intake means of an internal combustion engine.
Figure 6:
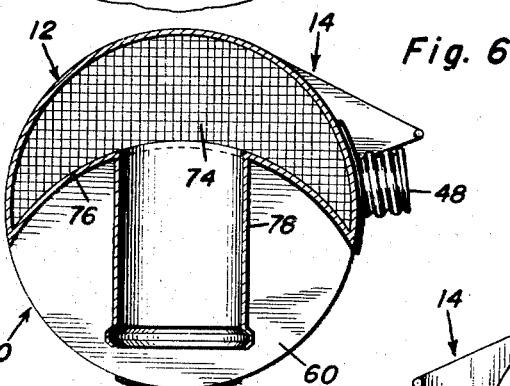
Figure 6 is a transverse vertical sectional view taken substantially upon the plane indicated by the section line 6—6 of Figure 2 and shows the general cross section of a clean air manifold and attached air duct.
Figure 8:
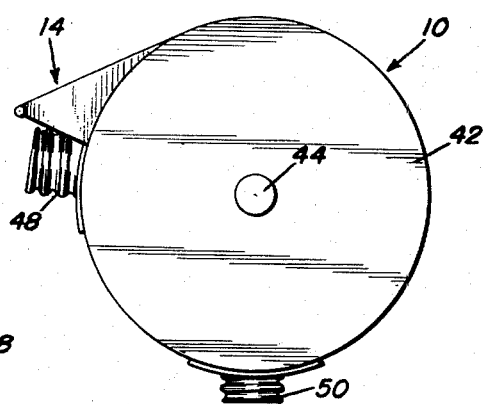
Figure 8 is another end view of the air conditioner and shows the same as viewed from the right in Figure 2.
Figure 7:
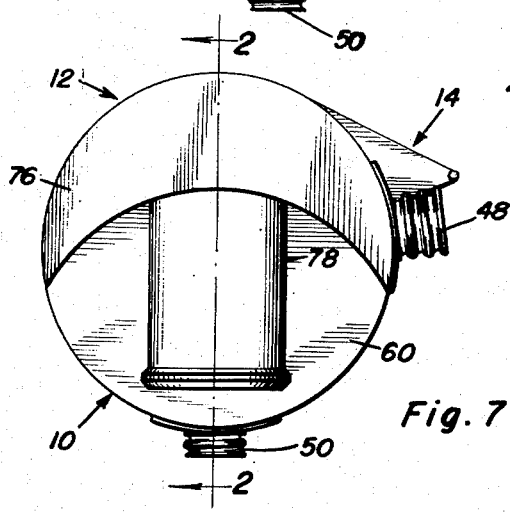
Figure 7 is an end elevational view of the air conditioner as viewed from the left in Figure 2.

Referring now to the drawings in detail, it will be seen that the air conditioner, which is the subject of this invention, includes an elongated cylindrical housing 10, which forms a major portion of the air conditioner, the housing 10 having integral with one end and extending longitudinally therefrom as an extension thereof a clean air manifold 12, which is of a reduced cross section. In order that air may pass into the housing 10, the same is provided with an intake assembly, which is referred to in general by the reference numeral 14, the intake assembly 14 being connected to the peripheral side wall of the housing 10 adjacent the end thereof opposite from the clean air manifold 12.

The air intake assembly 14 includes a hood assembly comprising a pair of longitudinally spaced parallel vanes or side walls 16, which are generally triangular in outline, secured to the outer surface of the cylindrical wall portion of the housing 10. The upper edges of the side walls 16 are connected together by a longitudinally extending top wall portion 18 which completes the hood of the air intake assembly. In order that the intake air may pass into the housing 10, the cylindrical wall of the housing 10 is provided with an inlet opening 20, the inlet opening being disposed between the junctures of the side walls 16 with the cylindrical wall portion of the housing 10. In order that passage of intake air through the opening 20 may be controlled, the outer edge of the top wall 18 has hingedly connected thereto a valve in the form of a door 22. The door 22 extends between the side walls 16 and is adapted to close the area between the same, the top wall 18 and the cylidrical wall portion of the housing 10. In order that downward swinging of the door 22, due to the forces of gravity, may be limited, there is provided a longitudinally extending stop 24 which extends between the side walls 16 and is secured thereto.

Figure 2:
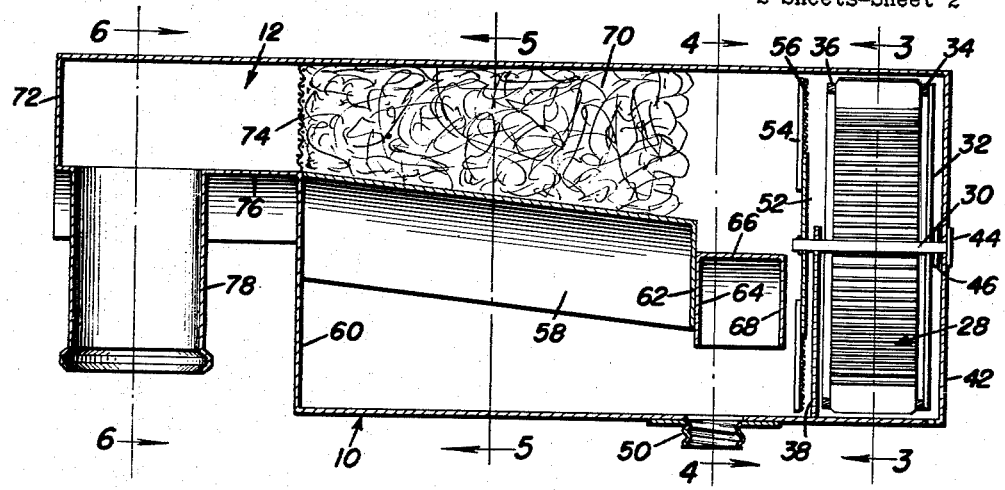
Figure 2 is a longitudinal vertical sectional view taken substantially upon a plane indicated by the section line 2—2 of Figure 7 and shows the general internal construction of the air conditioner.
Figure 5:
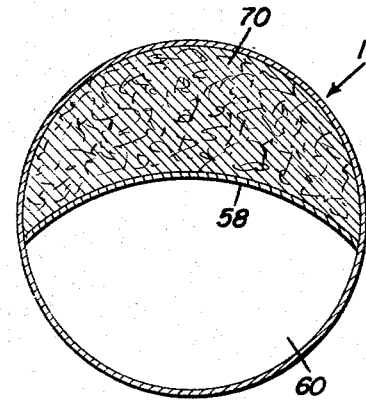
Figure 5 is a transverse vertical sectional view taken substantially upon the plane indicated by the section line 5—5 of Figure 2 and shows the general outline of a baffle forming a support for filter means for cleaning the air passing through the air conditioner of Figure 1.

Air passing into the housing 10 through the intake opening 20 engages blade 26 of a turbine wheel, which is referred to in general by the reference numeral 28. The turbine wheel 28, as is best illustrated in Figure 2, includes a longitudinally extending shaft 30 which has secured thereto adjacent the rear end thereof a cylindrical plate forming a hub 32. The hub 32 has secured to one face thereof adjacent the outer peripheral edge a cylindrical ring 34. A second cylindrical ring 36 is positioned in spaced parallel relation to the cylindrical ring 34 and is connected thereto by the blading 26.

Figure 3:
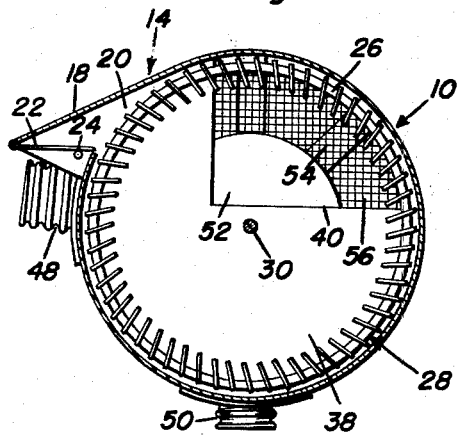
Figure 3 is a transverse vertical sectional view taken substantially on the plane indicated by the section line 3—3 of Figure 2 and shows the general arrangement of drive means and an attached water distributor, the drive means and water distributor being separated by a baffle.
Figure 4:
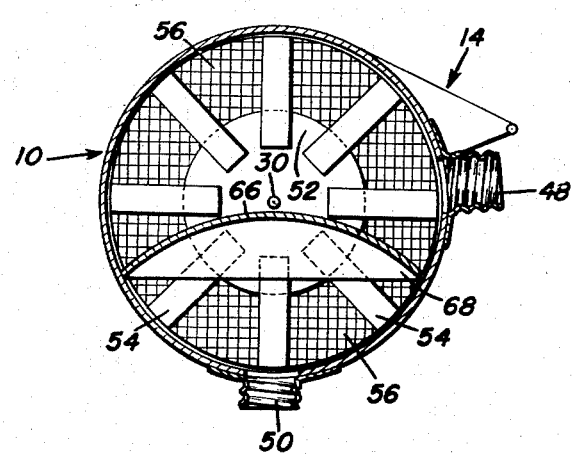
Figure 4 is a transverse vertical sectional view taken substantially on the plane indicated by the section line 4—4 of Figure 2 and shows the general construction of the water distributor and the outline of an associated baffle.

Partitioning the area in which the turbine wheel 28 is disposed from the remainder of the housing 10 is a transverse baffle 38, which as is best illustrated in Figure 3 is provided with an enlarged opening 40 in the upper portion thereof forming an air passage. It will be noted that one end of the shaft 30 extends through the baffle 38 and is supported thereby for rotation with respect thereto. The other end of the shaft 30 extends through a centrally located opening in an end plate 42 forming one end of the housing 10. The shaft 30 is provided with an enlarged shoulder portion 44 which engages the outer surface of the end plate 42 and prevents further inward movement of the turbine wheel 28. The turbine wheel has its hub 32 spaced from the end plate 42 by a spacer 46 carried by the shaft 30.

In order that air passing through the opening 40 may be cooled and cleaned, that portion of the housing 10 divided from the portion of the housing occupied by the turbine wheel 28 has the lower part thereof in the form of a water storage space in which water may be stored as desired.

Referring now to Figure 3 in particular, it will be seen that the cylindrical side wall portion of the housing 10 is provided with a pipe fitting 48 providing an inlet through which water may be poured. It will be understood that the pipe fitting 48, which is internally threaded, will be provided with a closure cap (not shown). It will be noted that the pipe fitting 48 is secured to the cylindrical wall portion of the housing 10 at substantially the midpoint of its height whereby the water storage space may be filled to approximately one half of the height of the housing 10. In order that water may be removed from the housing 10, the lower part of the cylindrical side wall portion of the housing 10 is provided with a second pipe fitting 50, which is identical to the pipe fitting 48. It will be understood that the pipe fitting 50, as well as the pipe fitting 48, communicates with the interior of the housing 10. The pipe fitting 50 forms a drain and is normally closed by a cap (not shown) which is threadedly engaged on the same.

In order that water may be distributed in front of the opening 40 as the intake air passes therethrough, the shaft 30 of the turbine wheel 28 has rigidly secured to the inner end thereof a hub 52. The hub 52 has secured to one face thereof a plurality of radially extending spokes 54 to which is secured an annular section of screen 56. It will be understood that the screen 56 is disposed in the same plane as the hub 52, which is in the form of a circular plate, and continuously passes through the water disposed within the housing 10. Inasmuch as the screen 56 will have the meshes thereof filled with water and the intake air is required to pass through the screen 56, the intake air will take up the moisture carried by the screen 56.

In order that the water storage area may be separated from the portion of the housing 10 through which the intake air passes, the housing 10 is provided with an elongated transversely curved baffle 58 which is secured to the inner surface of the cylindrical side wall portion thereof. The baffle 58 is secured at one end to the end plate 60 which forms the other end of the housing 10 and slopes downwardly away from the same toward the baffle 38. It will be noted that the baffle 58 has an inner end wall 62 which forms a support for the inner end thereof, the end wall 62 being in spaced parallel relation to the end wall 60 of the housing 10.

Secured to the end wall 62 of the baffle 58 is a first end wall 64 of a second baffle 66. The second baffle 66 is also transversely curved and is secured to the inner surface of the cylindrical side wall portion of the housing 10. The second baffle 66 is also provided with a second end wall 68, which is in spaced parallel relation to the end wall 64 and is disposed adjacent the hub 52, to which it is in spaced parallel relation. It will be noted that the upper surface of the baffle 66 is disposed below the inner end of the upper portion of the baffle 58 and the same has an axis which is parallel to the longitudinal axis of the housing 10.

As intake air passes through the screen 56, the excess water removed from the screen 56 by the intake air drops down upon the baffle 58 and is conveyed back into the water storage area. The intake air is cooled by its engagement with the water and then passes into a filter 70, which is formed of copper wool. The filter 70 is carried by the baffle 58 and closes that area of the housing 10 above the baffle 58. As the cooled intake air passes into the filter 70, foreign matter and further excess water is removed from the same. Some of the foreign matter and the excess water then passes down the sloping upper surface of the baffle 58 and onto the upper surface of the baffle 66 from which it passes back into the water storage area.

It will be noted that the clean air intake manifold 12 is of a constant cross section throughout and is closed at its outer end by a transverse end wall 72 which is in spaced parallel relation to a screen 74 carried by the housing 10. It will be noted that the screen 74 is in a sense an extension of the end wall 60 and forms a part of the same to complete the housing 10. The screen 74 prevents the passage of the copper wool forming the filter 70 into the clean air manifold 12. The clean air manifold 12 also includes a transversely curved bottom wall 76 to which is secured a vertical air duct 78. As is best illustrated in Figure 1, the vertical air duct 78 is secured to the upper end of an intake pipe 80. The intake pipe 80 may be in the form of an upper end of a conventional carburetor or any other intake pipe of an internal combustion engine.

It will be seen that air passing into the air conditioner is not only cleaned by the filter 70, but is cooled by the engagement of the same with the water disposed within the housing 10. Furthermore, inasmuch as the door 22 is retained in a closed position when the internal combustion engine is not operating, foreign matter will not be blown into the air cleaner, and, therefore, will not permit the entrance of dust when the vehicle to which the internal combustion engine is connected is not operating.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. An air conditioner for internal combustion engines comprising an elongated tubular body, having opposite ends thereof closed, a turbine wheel compartment at one end of said tubular body, a turbine wheel mounted within said turbine wheel compartment, said turbine wheel including a drive shaft, an air inlet in said tubular body adjacent said one end communicating with said turbine wheel compartment, a lower portion of said tubular body adjacent said turbine wheel compartment being in the form of a water storage compartment, a circular screen carried by said drive shaft in the path of air passing from said turbine wheel, said screen passing through said water storage compartment to supply moisture to air passing through said tubular body, a baffle overlying said water storage compartment, filter means carried in said tubular body in overlying relation to said water storage compartment, said filter mean being supported by said baffle, an air manifold extending from the other end of said tubular body and receiving air from said filter means, said manifold having an outlet adapted to be connected to a carburetor.

2. An air conditioner for internal combustion engines comprising an elongated tubular body, having opposite ends thereof closed, a turbine wheel compartment at one end of said tubular body, a turbine wheel mounted within said turbine wheel compartment, said turbine wheel including a drive shaft, an air inlet in said tubular body adjacent said one end communicating with said turbine wheel compartment, a lower portion of said tubular body adjacent said turbine wheel compartment being in the form of a water storage compartment, a circular screen carried by said drive shaft in the path of air passing from said turbine wheel, said screen passing through said water storage compartment to supply moisture to air passing through said tubular body, a baffle overlying said water storage compartment, filter means carried in said tubular body in overlying relation to said water storage compartment, said filter means being supported by said baffle, an air manifold extending from the other end of said tubular body and receiving air from said filter means, said manifold having an outlet adapted to be connected to a carburetor, said air inlet being provided with a hood, a valve carried in said hood, said valve being movable to an open position by air flowing through said air inlet.

References Cited in the file of this patent

UNITED STATES PATENTS

| Number | Name | Date |
| --- | --- | --- |
| 1,578,611 | Sanborn | Mar. 30, 1926 |
| 2,012,508 | Halstead | Aug. 27, 1935 |
| 2,018,493 | Halstead | Oct. 22, 1935 |
| 2,197,595 | Schneible | Apr. 16, 1940 |
| 2,435,798 | Rice | Feb. 10, 1948 |
| 2,576,503 | Dean | Nov. 27, 1951 |